United States Patent
Bowman

[19]

[11] Patent Number: 6,000,167
[45] Date of Patent: Dec. 14, 1999

[54] DISPLACEMENT PLANER

[76] Inventor: Patrick L. Bowman, 1507 Strawberry La., Johnson City, Tenn. 37604

[21] Appl. No.: 08/797,173

[22] Filed: Feb. 10, 1997

[51] Int. Cl.⁶ .................................................... A01K 91/00
[52] U.S. Cl. ............................................................ 43/43.13
[58] Field of Search .................................. 43/43, 13, 9.7

[56] References Cited

U.S. PATENT DOCUMENTS

| | | | |
|---|---|---|---|
| 2,726,475 | 12/1955 | Wiselka | 43/43.13 |
| 2,901,857 | 9/1959 | Lockert | 43/43.13 |
| 3,318,038 | 5/1967 | Desol | 43/43.13 |
| 3,507,068 | 4/1970 | Roberts | 43/43.13 |
| 3,949,512 | 4/1976 | Stegemeyer | 43/43.13 |
| 4,161,078 | 7/1979 | Pagagni | 43/43.13 |
| 4,486,970 | 12/1984 | Larson | 43/43.13 |
| 4,524,538 | 6/1985 | Halvorsen | 43/43.13 |
| 4,920,689 | 5/1990 | Anderson | 43/43.13 |
| 5,185,951 | 2/1993 | Hemmerle | 43/43.13 |
| 5,283,972 | 2/1994 | Kinoshita | 43/43.13 |
| 5,355,615 | 10/1994 | Specklemire | 43/43.13 |
| 5,548,919 | 8/1996 | Hicks | 43/43.13 |

Primary Examiner—Kurt Rowan

[57] ABSTRACT

A planer board device for carrying a tether line at a generally lateral distance from a moving boat whereby a releasable connection of a fishing line to an outboard point on the tether line can be made for running the bait at a desired distance from the boat. The device has a running axis and a backing plate adapted to lie generally in a vertical plane and having a leading bow section, a top section and a keel section. A tether plate is adapted to lie generally in a horizontal plane attached to one side of the backing plate intermediate its top and keel sections and extending outwardly substantially perpendicular to the vertical plane of the backing plate, tether line connector holes on the tether plate positioned outwardly of the backing plate flotation affixed to the backing plate above and below the tether plate, and a sinker strip affixed to a lower portion of the keel section, the flotation sinker strip and tether plate combining to maintain a substantially even keel of the device when being dragged through the water.

13 Claims, 1 Drawing Sheet

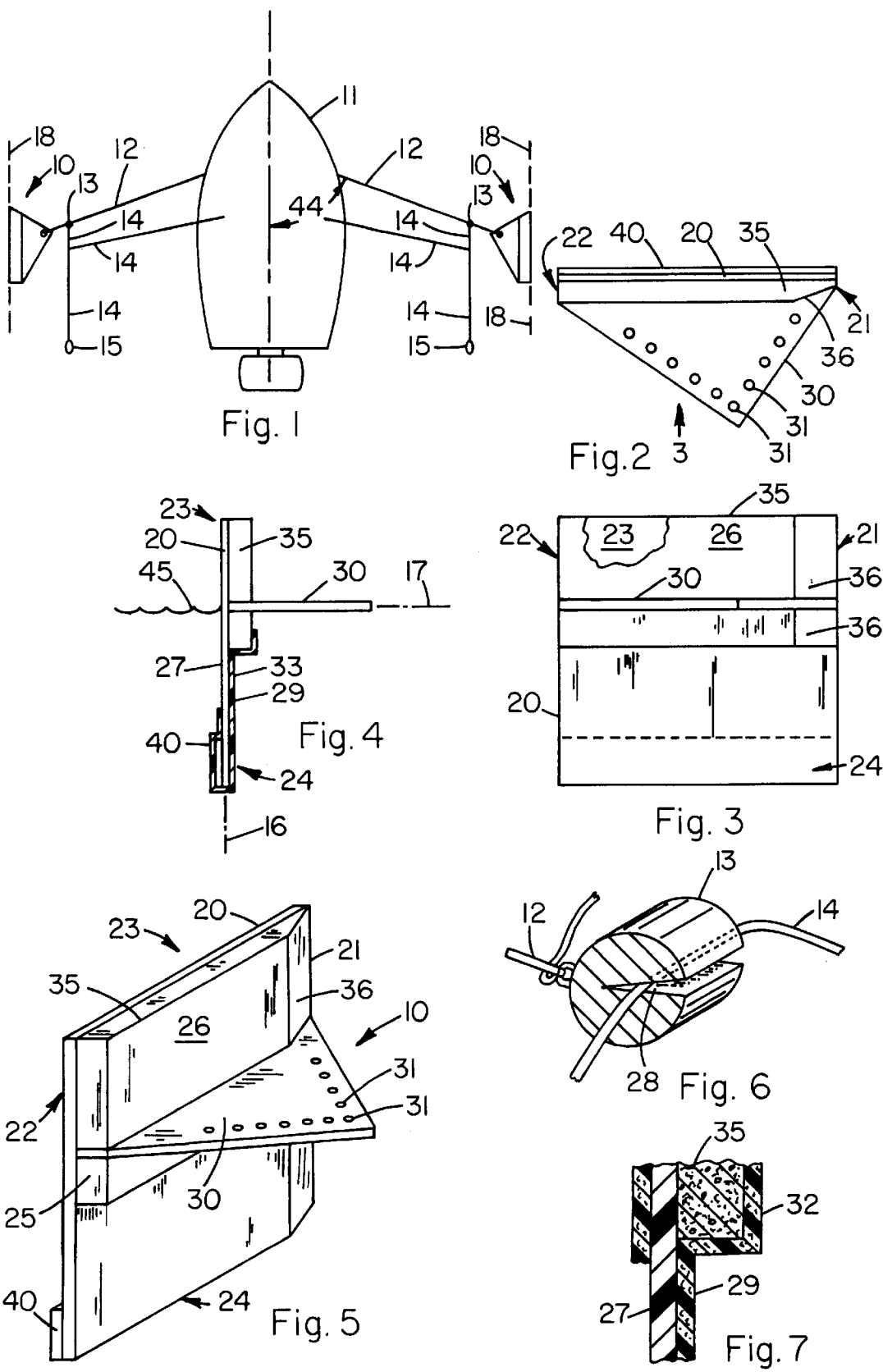

DISPLACEMENT PLANER

BACKGROUND OF INVENTION

1. Field

This invention concerns planer boards or skis, often termed "otter boards", used for outboard attachment of fishing lines for trolling. A problem of fishing behind a boat is that only so many lines may be cast out at any one time before they become entangled, either together or in the prop. Planer boards were divised to carry a fishing line away from the boat, i.e., outboard thereof, and keeping it there while trolling so that many more lines may be utilized.

2. Prior Art

Planer devices have heretofore been developed for the purposes described, e.g., such as shown in U.S. Pat. Nos. 5,548,919; 3,949,512; and 3,507,068. These devices teach a configuration, however, such that a fishing line is directly attached to the body of the device or in such a way that when a fish is hooked, retrieval of the fish must accompany the retrieval of the device, thereby exacerbating an already difficult task of fighting the fish. Also, many of these devices have a blocky structure which encourages the device to roll over in choppy or wavy water conditions, and which also increases the drag or resistance of movement through the water thereby negatively affecting the planning and flotation characteristics of the device. To overcome the negative effects of this construction, these devices must be pulled at a higher speed then that which would be most desirable for effective coverage of a certain productive fishing ground.

OBJECTS OF THE INVENTION

Objects, therefore, of the present invention are: to overcome the limitations of said previous devices and provide a side planing device of a configuration and structure highly stable in wavy or choppy water conditions; to provide such a construction which allows the device to be deployed and highly operational at very slow trolling speeds; and to provide such a device which utilizes selective engagement of a tethering line and thereby allows for the retrieval of the device independently of the fishing line, thus avoiding encumbering the process of retrieving of a fish.

SUMMARY OF THE INVENTION

The above and other objects have been attained in accordance with the present invention through the discovery of a displacement planer board construction which in its broad embodiment comprises a device for carrying a tether line at an outboard distance from a mowing boat whereby a releasable connection of a fishing line to an outboard point on the tether line can be made for running the bait at a desired distance from the boat. The device comprises a backing plate, a tether plate attached to one side of the backing plate, flotation means affixed to at least one side of the backing plate and disposed above and below the tether plate, and a sinker strip affixed to a lower portion of the backing plate. The tether plate is adapted for connection to a tether line connecting the device to the boat, and a fishing line releasable connection is provided for reasonably affixing the fishing line to a point along the tether line. All of these elements combine to maintain high stability to a planing device when being dragged through the water at practically any trolling speed.

BRIEF DESCRIPTION OF THE DRAWINGS

The invention will be further understood from the following drawings of certain preferred embodiments, and description thereof wherein:

FIG. 1 is a top down schematic view of fully deployed starboard and port planing devices, showing the relative position of each with respect to a boat to which they are attached;

FIG. 2 is a top elevational view of the present device showing most clearly the beveled edge front or bevel;

FIG. 3 is a side elevational view taken in the direction of arrow 3 in FIG. 2 of the present device showing the relative positions of intregal components thereof;

FIG. 4 is a rear to front view taken in the direction of arrow 4 in FIG. 2 of the present device.

FIG. 5 is a perspective view taken in a generally aft-to-bow direction;

FIG. 6 is a cross-sectional view, greatly enlarged, of a releasably connector for releasable attaching a fishing line to the tether line wherein all that is necessary is to frictionaly wedge the fishing line in groove 28 with a force equivalent to that desired for releasing the line when a fish strikes, and FIG. 7 is a cross-sectional view of a portion of the device coated with a protective resin material.

DETAILED DESCRIPTION OF THE DRAWINGS

Referring to the drawings of certain preferred embodiments and with particular reference to the claims herein, the present device generally designated 10 which, as shown in FIG. 1 withdraws a fishing line 14 during trolling generally laterally to a proximate position either port or starboard from a moving boat 11. The device 10 is tethered to the boat 11 by the use of a tether line 12. This tether line is made of any sturdy material, which will be of sufficient strength to provide for the repeated deployment and retrieval of the device some distance from the boat 11, but of a weight which will not impede the movement of the device through the water or make it sink. In a preferred embodiment this material is 20 to 30 lb. test Nylon fishing line. Releasably affixed to the tether line 12 some distance from the boat 11 is a releasable connector 13. as shown in FIG. 6, this may be any of a number of such devices which hold a fishing line 14 and provide for disengagement therefrom when the hook end of the fishing line 14 is forcibly pulled by a struggling fish.

The present device 10 comprises a backing plate 20 having distal or outer side 27 and proximal or inner side 33, which, in use, lies generally in a vertical plane 16 and supports other structure. A tether plate 30, in use, lies generally in a horizontal plane 17 which extends outwardly and substantially perpendicularly from backing plate 20. In certain preferred embodiments the backing plate 20 and tether plate 30 are each comprised of a thin sheet of strong composite material such as fiberglass or structural PVC, polystyrene or polyester. Other materials such as aluminum sheet or the like may also be used.

The flotation means 35 comprises synthetic, polymeric rigid foam material such as Nylon 6.6, polypropylene, polyethylene, polycarbonate, acrylonitrile-butadienc-styrene copolymer, polystyrene, polyurethane, poly (vinyl chloride) or the like having the characteristics of a durable surface and exceptional buoyancy. Polyurethane foam having a density of from about 0.4 to about 0.6 kg/m$^3$ is one preferred material.

The sinker strip 40 is constructed of lead or other heavy material having a high weight to size ratio.

Also, in a preferred embodiment, the tether plate 30 is triangular as shown in FIGS. 4 & 5, such that the upper section 19 of the backing plate 20 and the entire tether plate 30 are disposed above or approximately on the water line 45.

Sinker strip 40 is preferably connected to the distal or outer side 27 of the backing plate 20 and is, of course, disposed under water and helps to maintain an approximate vertical posture of the backing plate.

A front bevel or rudder 36 is provided on the bow section of the flotation means 35, and may also be formed on adjacent portions of backing plate 20.

It's preferred to encase the entire device in a tough, cured coating of epoxy resin or the like 29 a portion of which is shown in FIG. 4, for protection as well as eliminating any possibility of contaminating the water. Also, either of the plate 20, flotation means 35 or coating 29 may be pigmented or otherwise colored by high visibility fluorescent material 32.

It has been found that a lower segment 25 of the flotation means 35 positioned as shown enhances the flotation and stability of the device to an unexpected degree. Most preferably, the ratio of the volume of segment 26 to the volume of segment 25 of the flotation means ranges from about 2.2 to about 4.5, and most preferably from about 2.5 to about 3.5. It is noted that the approximate relative dimensions of the various parts of the device as shown in the drawings represent a preferred functional embodiment.

OPERATION

The present device while deployed in the water presents a thin cross section as shown in FIG. 4, and broad plane surfaces as shown in FIG. 3. The thin cross section allows the device to cut through the water in a substantially aquadynamic manner whereas the plane surfaces provide resistance to lateral movement and substantially maintain the device on course, i.e., generally along running axis 18, whether or not a fishing line is attached to the tether line 12.

In order for the device to maintain a relatively uniform distance from the boat, the bevel 36 acts as a front rudder. While the device is moved forward by the boat, water is forced across bevel 36, which faces generally towards the boat, creating differential water pressures between the sides of the backing plate 20 which in turn steers the device outwardly from the boat and holds it in that position, by i.e., along its running axis, by way of tension on the tether line 12.

The holes 31 in the tether plate provide the opportunity to adjust the connection point of tether line 12 relative to the device 10, thereby influencing the running axis of the device relative to the boat 11. This feature is desirable for accommodating an increased or decreased load on the tether line exerted by the bait 15 and/or the water tides or other movements. The holes 31 in a position toward the bow 21 provide for a lighter load on the tether line 12 or for faster trolling speeds by dampening the effect of the front rudder for outward movement away from the boat 11. These forward holes allow the tether line to pull the bow toward the boat thereby decreasing the tack angle 44 of the device. The holes 31 toward the aft of the device provide for a heavier load on the tether line 12 or slower trolling speeds by exaggerating the ruddering effect of the front bevel 36. These aft holes rotate the bow 21 away from the boat thereby increasing the tack angle 44.

It is particularly noted that previous devices have the propensity to fall over in heavy water, whereas three notable features of the present device enable greater upright stabilization as shown in FIG. 4 than was previously attainable.

First, the displacement of the weighted keel section 24 of the backing plate 20 provides a strong downward counteraction to the buoyancy imparted to the upper section of the backing plate by the flotation material 35, thus maintaining the upright position in heavy water.

Secondly, the extended, outward positioning of the tether plate 30 acts as a side stabilizer by glancing the water surface 45, particularly should the device be thrown hard in that direction.

Thirdly, the floatation material upper segment 26 affixed to the backing plate 20 above the attachment point of the tether plate 30 provides an extra measure of buoyancy in very rough water.

A typical technique for using the present in-line planer board is as follows: With a boat in a slow forward motion being propelled by an electric trolling motor, deploy live bait about twenty-five yards off the back of the boat on small ten-pound spinning tackle. Then attach the in-line planer to the fishing line with a releasable connector. The in-line planer's job is to carry the bait away from the boat at a large angle which can vary according to three factors, i.e., the amount of line let on or off the reel, choppy or smooth water conditions, and, the most crucial factor, boat speed. Once a fish hits the bait, the in-line planer comes loose from the fishing line using special release clips or connectors. This allows fighting the fish without having to fight the weight of the in-line planer board. This technique is an awesome way of catching not only Stripers, but also Walleyes, Bass, Crappies, and other game fish which like bait presented in a slow, methodical manner.

The major pitfalls in using the above with this technique with currently available in-line planers are that:
 they cannot be used at extremely slow speeds;
 such as while using an electric trolling motor;
 they tend to lag behind the boat at slow speeds;
 they fall over on their side, cutting the fishing line; they tend to fall over in heavy chop making them hard to see; they have only one speed in which they run-often too fast to effectively cover productive fishing ground; and they require that the fishing line has to be attached to two different points on the planer, which can cause a frustrating fishing experience.

Advantages of the present planer include: will work while at drift and at almost dead slow trolling speeds i running at extreme angles from the boat, which offers maximum coverage of productive fishing ground; slow trolling speeds appeal to fishermen of electric trolling motor-propelled boats and small gas-powered boats; can be used from an anchored boat in little current; hassle-free design requires only one attachment point for the planer to work; can be fine-tuned by the multiple attachment holes to troll extremely slowly or moderately fast; remains upright in essentially all choppy water conditions; fluorescent color makes the planer easy for the operator and operator of other vessels to see; can be tethered to the boat or to a rod or reel or the like on the boat and used like a ski board without the use of special booms or other equipment; and small size makes it easy to store in small boats as compared to some such skis.

The basic construction of the present planer consists of three parts: (1)the upper vertical wing; (2)the horizontal wing stabilizer; and (3)the keel section.

A significant difference between the present planer and current in-line planers is that the present planer has a unique keel that displaces roughly four inches of water. The keel requires only minimal sideways force to propel the planer at an extreme angle, i.e., partically 90 degrees from the vessel, much the same way as air pressure affects a kite. Conventional in-line planers tend to set on top of the water and require higher trolling speeds, often making them ineffective for many live bait fishing conditions.

The keel's thin vertical axis allows the planer to track through the water with minimal drag. The ballast in the lower portion of the keel maintains the planer in an upright position at rest, through various slow-trolling speeds and choppy water conditions. The relatively thin sections of flotation in the upper portion of the keel provides just enough vertical lift to keep the horizontal wing stabilizer out of the water, therefore reducing drag.

The horizontal wing stabilizer steers the planer by moving the pivot point of the center of the planer to the forward section. Small holes in the forward section of the wing stabilizer provide a means of making fine adjustment of slow trolling speeds. The outer-most hole is used at extremely slow speeds while the inner-most hole can be used at faster speeds. The thin horizontal plane of the wing allows minimal drag coefficient.

The upper vertical portion of the planer simply floats the planer high above the water making for safe, simple visual contact by the operator and also operators of approaching vessels.

The invention has been described in detail with particular reference to preferred embodiments thereof, but it will be understood that variations and modifications will be effected within the spirit and scope of the invention.

I claim:

1. A planar board device for carrying a tether line at a generally lateral distance from a moving boat whereby a releasable connection of a fishing line to an outboard point on the tether line can be made for running the bait at a desired distance from the boat, said device having a substantially directionally constant running axis and comprising backing plate means adapted to lie generally in a vertical plane, and having inner and outer sides, a leading bow section, an aft section, a top section and a keel section, a substantially planar tether plate means having two sides adapted to lie generally in the horizontal plane of the water during running of the planer board and attached to said inner side of said backing plate means along a joint intermediate said top and keel sections and extending substantially the full length of said backing plate means and outwardly from said inner side generally in said horizontal plane which is oriented substantially perpendicular to said vertical plane, tether line connector means on said tether plate means positioned laterally outwardly of said backing plate means for substantially permanently connecting said device to a tether line and for maintaining the connection throughout the trolling operation or fishing run of the boat, and for maintaining a tension on the tether line along an axis generally perpendicular to said running axis such as to maintain said device on a course away from and generally parallel to a fishing line, whether a fishing line is affixed to said tether line or not, floatation means affixed to at least one side of said backing plate means and comprising an upper segment above and a lower segment below said horizontal plane of said tether plate means, and sinker strip means affixed to a lower portion of said keel section, said floatation means, said sinker strip means and said tether plate means combining to maintain a substantially even vertical keel of said backing plate means when being dragged through the water and whether affixed to a fishing line or not.

2. The device of claim 1 wherein said flotation means maintains said keel section substantially below water line, and maintains said top section substantially above said water line, and maintains said tether plate means substantially horizontally on the surface of the water.

3. The device of claim 2 wherein the ratio of the surface area of said top section to the surface area of said keel section is from about 1.5/1.0 to about 1.0/1.5.

4. The device of claim 3 wherein said backing plate means has a thickness of from about $1/16$ in. to about $3/16$ in. and has for each side a surface area of between about 40 and 100 square inches.

5. The device of claim 1 wherein said tether plate means comprises a horizontal stabilizer having a triangular configuration such that the base of the triangle corresponds to a portion of said tether plate means which is attached to said backing plate means, and extends substantially the full length of said backing plate means, and an apex of said triangle is located outwardly from said backing plate means a distance equal to about one half the total height of said backing plate means, whereby said tether plate means provides further vertical keel stability to said backing plate means during running of the device.

6. The device of claim 4 wherein each side of said tether plate means has a surface area of from about 10.0 to 20.0 square inches.

7. The device of claim 1 wherein said tether line connector means is a series of holes to which one end of a tether line is attached, the other end of a tether line being attached to a boat.

8. The device of claim 1 wherein said sinker strip is aquadynamic and substantially flat with a thickness of from about $1/16$ in. to about $1/8$ in. and is attached to a distal side of said backing plate means.

9. The device of claim 1 coated with a thin film of high strength epoxy or polyester resin.

10. The device of claim 1 coated or impregnated with a distinguishing high visibility fluorescent color material.

11. The device of claim 1 wherein the ratio of the volume of the upper segment of said flotation means to the volume of the lower segment of said flotation means is from about 2.5 to about 3.5, and said flotation means is rigid and comprised of a foamed polymeric material selected from the group consisting of polyurethane, polystyrene, polypropylene, polyethylene (high density), polycarbonate, Nylon 6.6, poly (vinyl chloride), or acrylonitrile-butadiene-styrene copolymer.

12. The device of claim 1 wherein said flotation means is comprised of polyurethane foam having a density of from about 0.4 to about 0.6 kg/m3.

13. A planar board device for carrying a tether line at a generally lateral distance from a moving boat whereby a releasable connection of a fishing line to an outboard point on the tether line can be made for running the bait at a desired distance from the boat, said device having a running axis and comprising backing plate means having two sides adapted to lie generally in a vertical plane, a leading bow section, and aft section, a top section and a keel section, tether plate means adapted to lie generally in a horizontal plane and attached to one side of said backing plate means along a joint intermediate said top and keel sections and extending outwardly substantially perpendicular to said vertical plane, tether line connector means on said tether plate means positioned outwardly of said backing plate means, floatation means affixed to at least one side of said backing plate means above and below said tether plate means, and sinker strip means affixed to a lower portion of said keel section, said floatation means, said tether plate means being of a triangular configuration such that a base of the triangle corresponds to the portion of said tether plate means which is attached to said backing plate means, and extending substantially the full length of said backing plate means, said apex of said triangle being located outwardly from said backing plate means a distance equal to about one half the total height of said backing plate means, said floatation means said sinker strip means and said tether plate means combining to maintain a substantially even keel of said device when being dragged through the water.

* * * * *